Dec. 1, 1970   C. A. GALLAGHER   3,545,005
HOTBOX DETECTOR
Filed Dec. 18, 1968   3 Sheets-Sheet 3
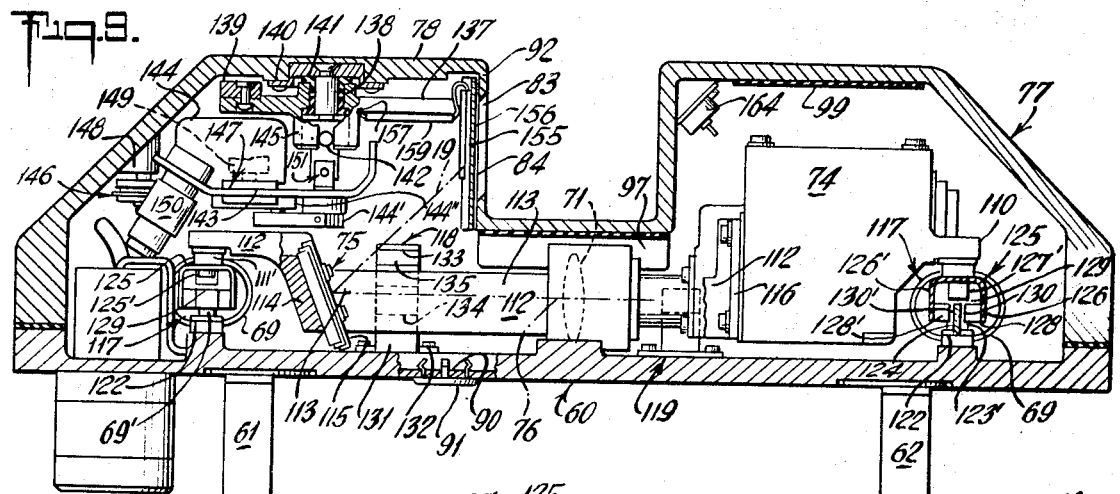
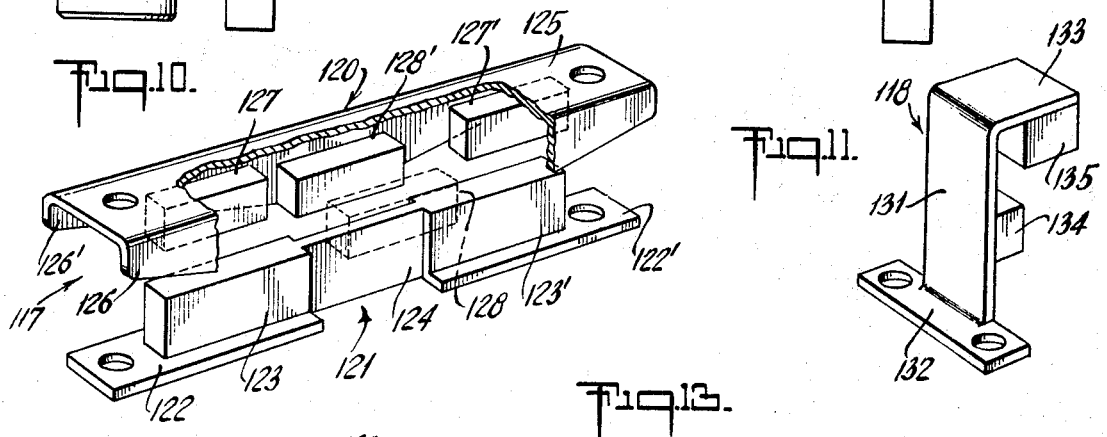
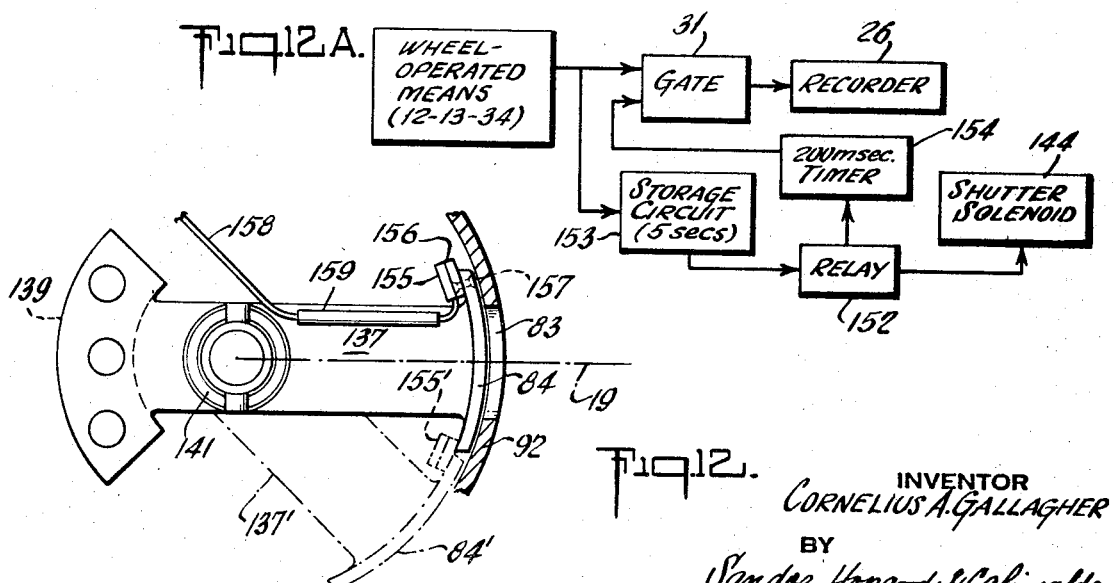
INVENTOR
CORNELIUS A. GALLAGHER
BY
Sandoe, Hopgood & Calimafde
ATTORNEYS

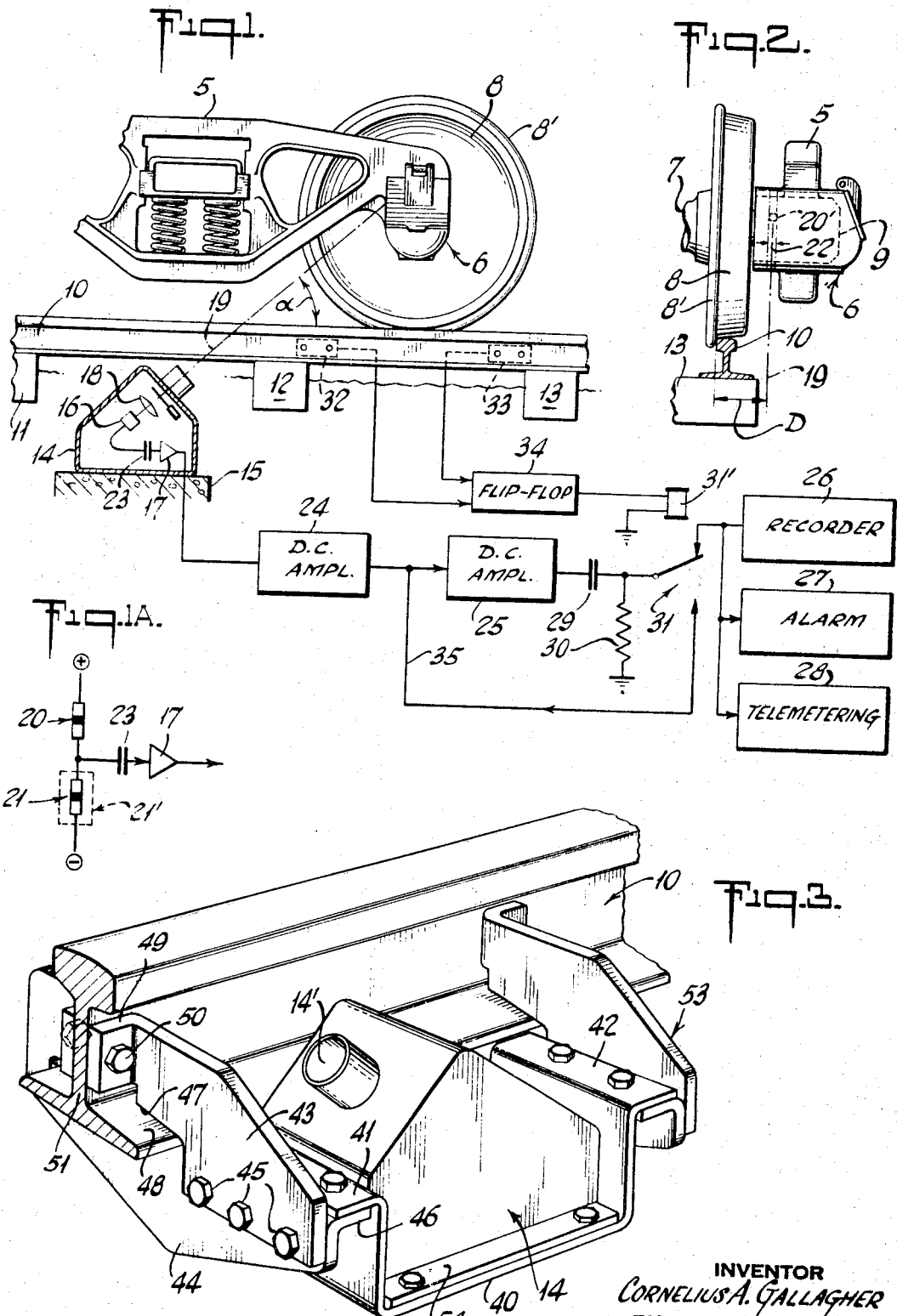

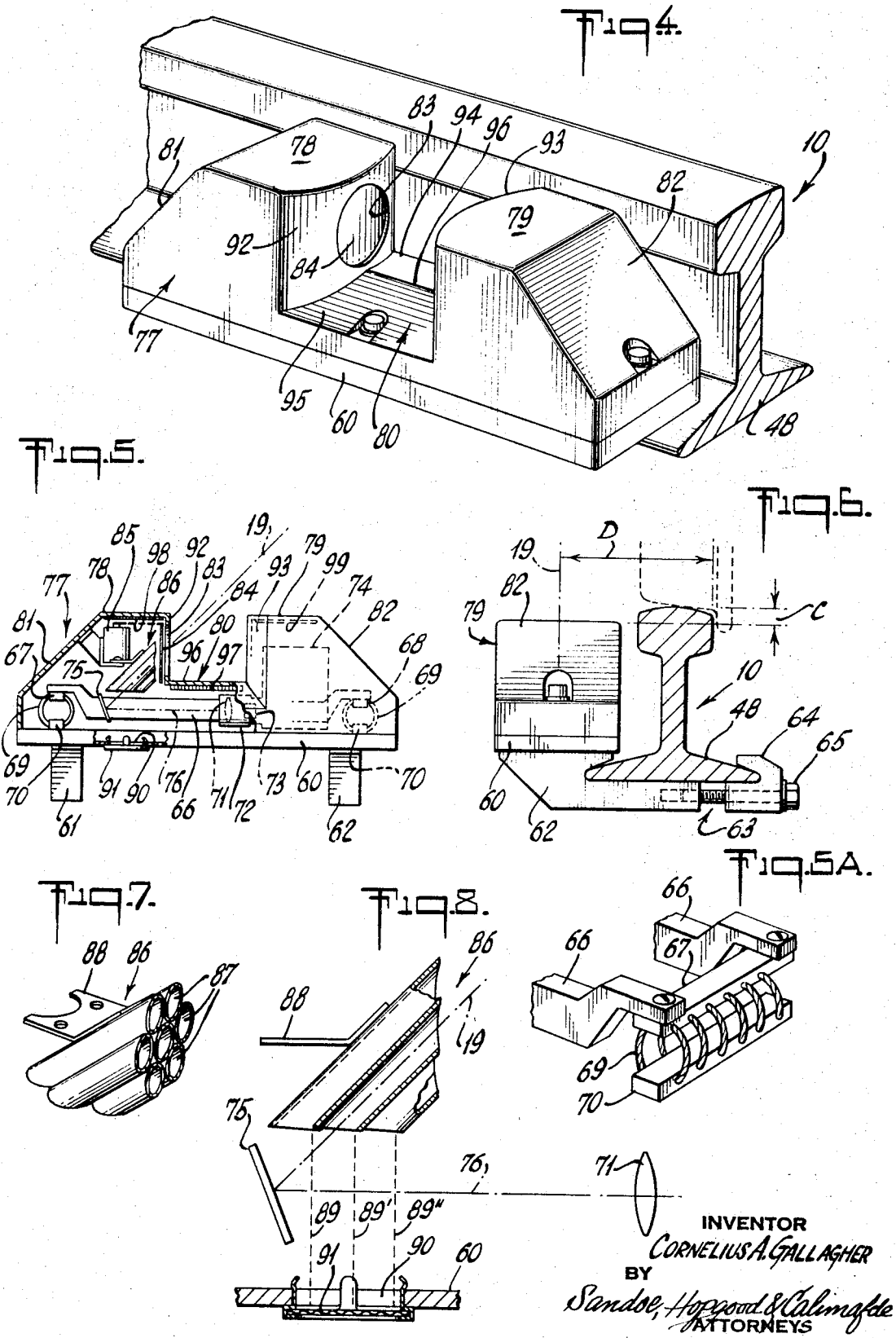

United States Patent Office 3,545,005
Patented Dec. 1, 1970

3,545,005
HOTBOX DETECTOR
Cornelius A. Gallagher, 18 High St., Syosset, N.Y.
Continuation-in-part of application Ser. No. 720,441, Apr. 11, 1968, which is a continuation-in-part of application Ser. No. 489,898, Sept. 24, 1965. This application Dec. 18, 1968, Ser. No. 784,802
The portion of the term of the patent subsequent to July 8, 1986, has been disclaimed
Int. Cl. B61k 9/06; B61l 3/06
U.S. Cl. 246—169                              25 Claims

ABSTRACT OF THE DISCLOSURE

The invention contemplates an infrared hotbox detector wherein scanning of corresponding sides of successive journal boxes is accomplished "inside" or "behind" the truck frame, utilizing a detector scanner which may be carried by the track itself and which may rely upon gating means also carried by the track itself. The detector response axis is more steeply inclined upward than heretofore, and is in a generally vertical plane parallel to the track. Improved performance is attributable to improved features of construction and arrangement in the scanner.

---

My invention relates to infrared hotbox detector systems and represents an improvement over those in general use today and over those disclosed in U.S. Pat. 2,880,309. This application is a continuation-in-part of my copending application, Ser. No. 720,441, filed Apr. 11, 1968 which issued as U.S. Pat. 3,454,758 on July 8, 1969, which in turn is based on parent application, Ser. No. 489,898, filed Sept. 24, 1965 now abandoned.

Most hotbox detectors in use involve a heat-sensing electrical element, fixedly mounted alongside a railroad track, and incorporating an optical system which images the heat-sensitive area along a scan axis which is inclined upwardly about 25° above the horizontal and which is also "toed-in" toward the track, at about 10° in the horizontal plane. The spacing outwardly from the track is such as to cause the scan axis to intercept those projecting parts of passing journal boxes as extend outwardly of truck frames; in the intervals between journal boxes, the scan-axis orientation is such as to assure a relatively quiescent radiation background, provided by car bottoms and car ends, as long as a given train is passing.

When infrared hotbox detectors were first introduced, several years ago, the railroads were only too glad to have an instrument which could reliably inspect the heat condition of all passing freight-car journal boxes of the common plain-bearing type. It was soon found that the hotbox detector could also inspect bearings on cars equipped with roller bearings. However, it has become more apparent recently, with the increasing number of roller-bearing equipped cars, that scanning of the character indicated may not be completely adequate, for one or more of several reasons:

(1) Railroads are being equipped with greater numbers of heavy duty cars, involving larger wheel diameters, so that diameters can now be expected to range from 27 inches to 38 inches, and occasionally 42 inches.

(2) There is about a 2-inch range of lateral motion involved in the axial play of most journal boxes with respect to a gauge-line reference on the track.

(3) Roller bearings have inherently smaller profiles than plain bearings, so that a scan that is optimized for plain bearings may result in grazing or missing some roller bearings.

(4) A grazing scan of a roller bearing (which, to external appearances, normally runs hotter than a normal plain bearing) can produce the misleading indication of a normal plain bearing on one side of the track, while the full scan of the normal roller bearing at the other end of the same axle may appear as an over-heated plain bearing.

The result of these and possibly other inadequacies of today's scanning philosophy is that roller bearings are inadequately checked, the trains are unnecessarily stopped (due to the erroneous conclusion that a hotbox condition exists), and that some erroneous radiation profiles are recorded.

It is, accordingly, an object of the invention to provide an improved infrared hotbox-detector system which will not be subject to the foregoing deficiencies.

A specific object is to provide an infrared hotbox-detector system which will inherently accommodate the scanning of a greater variety of wheel sizes and of journal bearings, be they plain bearings or roller bearings.

Another specific object is to meet the foregoing objects with a detector system which will be able to function reliably even though it must be exposed occasionally to the sky, in intervals between cars.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a simplified fragmentary view in side elevation of a length of track with a hotbox-detector scanner shown in relation to a passing freight-car truck, certain electrical components being also schematically shown;

FIG. 1A is an electrical diagram, schematically indicating in greater detail a portion of the apparatus of FIG. 1;

FIG. 2 is a simplified view in elevation of the wheel, axle, bearing and track of FIG. 1, taken generally at right-angles to FIG. 1;

FIG. 3 is a fragmentary view in perspective to illustrate a modified construction;

FIG. 4 is a fragmentary view in perspective to illustrate another modified construction;

FIG. 5 is a simplified view in side elevation of the structure of FIG. 4, partly broken away and sectioned, to illustrate the general arrangement of internal parts;

FIG. 5A is an enlarged simplified perspective view of a part of the structure of FIG. 5;

FIG. 6 is a right-end view of the structure in FIG. 5;

FIG. 7 is an enlarged view in perspective of one of the mechanical components of FIG. 5;

FIG. 8 is a simplified sectional view of the component of FIG. 7, taken in a central vertical plane and schematically shown in its relation to optical parts;

FIG. 9 is an enlarged view similar to FIG. 5 but showing further detail and certain modifications;

FIG. 10 is an enlarged, partly broken-away perspective view of two interfitting subassemblies forming part of snubber structure employed in FIG. 9, the subassemblies being shown in exploded relation to reveal detail;

FIG. 11 is a perspective view of further snubber structure;

FIG. 12 is an enlarged plan view of shutter structure of FIG. 9;

FIG. 12A is a simplified electrical block diagram of electrical control elements for a part of FIG. 9; and FIG. 13 depicts a graphical recording illustrative of detector response.

Briefly stated, the invention contemplates an improved infrared hotbox detector wherein scanning of corresponding sides of successive journal boxes is accomplished "inside" or "behind" the truck frame. The scanning plane is generally parallel to the track, and the elevation of the scan axis is somewhat steeper than previously. While this orientation results in occasional brief exposure of the detector to the sky (which is negative when compared with car-bottom radiation, except when directly viewing the sun), reference is, in some instances, established immediately prior to the journal scan. However, when the journal itself is encountered immediately after a brief exposure to the sky, the employment of long amplifier time constants approaching DC amplification virtually eliminates amplifier overshoot, which otherwise produces false signal amplitudes of the desired polarity during the scan of the journal in question. The deleterious effects of sky exposure are thus reduced to insignificance.

Referring to FIGS. 1 and 2 of the drawings, the invention is shown in relation to a length of railroad track having an elongated rail 10, supported on spaced crossties 11–12–13. Between two ties (11–12) a detector housing 14 is shown fixedly mounted on a concrete base or pedestal 15, in such manner that the upper faces of the ties provide inherent protection of the detector from dragging equipment, such as a brake beam which may have become partially dislodged and which is dragged along with train movement.

In FIGS. 1 and 2, a passing train is suggested by a freight car having a standard truck with a side frame 5 and having journal boxes (as at 6) at opposite ends. The axle 7 for wheel 8 is journalled in box 6, which may be of the plain bearing variety (as shown in solid outline) or of the roller-bearing variety (as suggested by the smaller phantom profile in FIG. 2).

The detector housing includes a heat-detector cell 16, which as explained in said patent, may comprise active and shielded thermistor-bolometer elements 20–21, bridge-connected and supplying to preamplifier means 17 an electrical output reflecting infrared radiation (as a function of time) impinging on the active element 20 of cell 16. The infrared radiation at cell 16 is collected by an optical system, such as lens 18, focussed at the general elevation of passing journal boxes and having an optical axis 19 oriented upwardly at an angle $\alpha$, and generally in the longitudinal direction of the track 10. Shielding for the unexposed detector element 21 is suggested at 21' (FIG. 1A), and all elements 20–21–21' may be contained within the cell 16. The bolometer bridge is DC biased, as suggested by polarity legends in FIG. 1A.

In order for the detector to have its best chance to scan faithfully, the thermistor-bolometer elements are carefully matched and selected for a relatively fast time constant, a preference being indicated for mounted-flake thermistor bolometers having a time constant of about, or at least no greater than substantially, 2 milliseconds. Also, the sensitive area of the exposed bolometer 20 is preferably such that when imaged by optics 18 at the elevation of passing journal boxes of average height, the thus-projected effective sensitive area 20' (FIG. 2) of the cell element 20 is about one-half inch square, thus defining a scan path (suggested by phantom lines 22, FIG. 2) about one-half inch wide.

To complete the general identification of parts, the preamplifier 17 is shown capacitance-coupled at 23 to the junction of cell elements 20–21, and the preamplifier output may be fed by cable from the housing 14 to further amplifiers 24–25, for ultimate utilization by recorder, alarm or telemetering means 26, 27, 28, respectively, depending upon user requirements. In the form shown, the output of the signal-processing amplifiers appears via a capacitor 29 across a resistor 30, and gating means suggested by relay contacts 31 serves to select essentially only the journal-heat parts of the signal for utilization at 26–27–28.

The gate is shown operated by a pair of spaced magnetic-induction wheel-trip devices 32–33 (as disclosed in detail in U.S. Pat. No. 3,151,827) which are shown bolted to the web of rail 10, on the inner side, so that gate-actuating electrical pulses may be able to mark the respective instants when the wheel flange 8' enters the magnetic gap of each of trips 32–33. These separate pulses are fed to a flip-flop circuit 34 to generate a suitable square-wave gating signal, shown fed to the solenoid 31' for relay contacts 31. The connection of the described parts, and the spacing and longitudinal location of trips 32–33 (with respect to scan axis 19), is such that for all journal-box sizes (e.g., roller bearings 6 and plain bearings 9) and for all axle elevations (e.g., for wheel diameters 27 inches to 42 inches), the gate-opening pulse (e.g., determined by wheel coaction with trip 32, for trailing-aspect viewing) and the gate-closing pulse (e.g., determined by wheel coaction with trip 33, for trailing-aspect viewing) will be just sufficiently wide (i.e., of sufficient duration) that axis 19 may scan all passing journals. In that gated interval, the relay 31 is actuated to its upper position to deliver the instantaneous amplified heat signal to the recorder 26 or other utilization means. It will be understood that for forward-aspect viewing, the train will be passing the detector from the opposite direction, meaning that trip 33 will generate the gate-opening and trip 32 the gate-closing pulses; gate operation will be otherwise the same as for trailing-aspect viewing.

As a feature of the invention, I achieve gating not only by the interruption of heat-signal supply to the utilization means (as described) but also by degeneratively feeding-back the heat-signal output at 30 during the ungated periods. This is schematically indicated by a lower connection for contacts 31 (i.e., when solenoid 31' is deenergized) and by a feedback line 35 to the input of amplifier 25. This feedback connection is preferably made far enough back in the signal-processing circuitry 24–25 to assure that any high-amplitude heat signals occurring in the ungated period shall not affect fidelity during the gated (desired heat-signal) period.

It is a further feature of the invention that every effort be made in the design of the individual amplifier circuits to assure a relatively low frequency response in the overall system. Temperature sensitivity and unbalance in the thermistor flakes dictate A-C coupling at 23 to pre-amplifier means 17, but to the maximum extent possible D-C amplification techniques are preferred in preamplifier means 17 and in subsequent signal-processing circuitry 24–25, the latter being expressly labelled as D-C amplifiers. This approach to amplifier design has been found to reduce to insignificance the so-called "third-pulse" problem which is sometimes encountered as the scan axis 19 gets a brief look at the sky between cars, after having just scanned the last two journal boxes of one car and before scanning the first journal box of the next car. The improvement is noted by such reduced amplifier overshoot (due to the brief sky look) as to insubstantially affect the ability of the system to "reference" on the relatively quiescent bottom (or undercarriage) of the next car before scanning the first journal box thereof.

For greater universality in the scanning of all varieties of journal boxes (roller bearings and plain bearings), I prefer to utilize a scan-axis orientation that is substantially in a vertical plane parallel to the track 10, and preferably "behind" or "inside" the truck frame 5. This relationship is suggested in FIG. 2 wherein the scan axis 19 is shown spaced the distance D outside the gauge line of rail 10; ordinarily this distance D is in the range of five to seven inches, i.e., about six inches. I have found that this location assures that all journal boxes will be scanned, and I have found that with the amplification and other techniques described as above I can tolerate a substantially greater elevation angle $\alpha$ than heretofore used. In general, the angle $\alpha$ should be in the range 40° to 50°, and it is preferably 45°, plus or minus 3°. The axis 19 should preferably be in the vertical plane parallel to the track, but slight departures of toeing angle, in or out of this plane, are possible (e.g., up to about 5° toe-in) while still obtaining advantages from the indicated "behind"-frame scan.

Another advantage attainable with the indicated "behind"-frame scan is that with suitably rugged components the entire detector housing may be fixed to the rail itself. Such an installation is shown in FIG. 3 wherein the housing 14 is mounted to the bed of a cradle 40, depressed below similar supporting end flanges 41-42 which in turn are secured to like supporting brackets secured at longitudinally spaced points to the rail 10, preferably so located as to suspend cradle 40 in the space between adjacent cross-ties. In FIG. 3, the front bracket is shown to comprise upper and lower overlapping plate members 43-44, bolted at 45 at their region of overlap, and providing a suitable mounting flange 46 for reception of the cradle flange 41. The upper plate 43 is cut away at 47 for support on the upper surface of the base 48 of rail 10 and is bent at its end to define a lug 49 for snug bolting at 50 to the web 51 of rail 10. The lower plate 44 is integrally formed at one end with flange 46, and it extends beneath the rail 10, being shaped at its other end with cut-away and lug formations (as at 52) to enable support on the other side of base 48 and to enable snug bolting by means 50 to the web 51 of the rail. It will be understood that the other supporting bracket means 53 is formed similarly to the one described in detail except that all flanges face in the opposite direction, to enable proper support of the cradle flange 42.

It will be seen that I have described an improved hot-box detector system characterized primarily by a scan-axis orientation that is much more universally applicable to all bearing configurations than any previously utilized. The higher elevation angle $\alpha$ characteristic of this new scan technique is made possible by the lower-frequency amplifier response achieveable by maximum utilization of D-C amplifier techniques, thus minimizing "third-pulse" effects from transient looks at the sky between cars; it is also made possible by degenerative feedback in the amplifier system during ungated intervals, and smaller imaged detector area and a faster bolometer time constant also contribute to the desired result. My further observations have been that the described amplifier techniques are of substantial benefit in application to the conventional outside-the-frame, toed-in scanning, but that they are necessary for thermistor-bolometer scanning behind the frame. The higher elevation angle $\alpha$ of my behind-frame scanning has the further advantage of permitting shorter gate intervals than heretofore, while at the same time accommodating a maximum range of wheel sizes and bearing configurations.

A particular advantage of the parallel-to-track scanning of this invention is that the detector housing 14 can be made with its viewing axis alignment (through opening or sun shade 14') completely symmetrically centered between base-mounting flanges (as at 54). Ordinarily, trailing-aspect viewing is to be preferred because of the lesser dust or dirt accumulations at 14' and 18; but in the event that for a few moments of a few days of each year, and for a particular detector-installation site, the sun may pass directly in the line of sight of axis 19 (between cars), then my system permits the simple maintenance operation of temporarily reversing the detector housing mounting end-for-end, for temporary forward-aspect viewing, without introducing any alignment problems. When the troublesome sun-elevation period has passed, the housing 14 can be simply reversed again, for continued trailing-aspect viewing. Of course, duplicate wheel trips 32-33 (or remounting of the same two wheel trips) will have to be appropriately located for the temporarily changed viewing situation, but, again, this is a simple "nut-and-bolt" maintenance operation, requiring no special realignment of the detector itself.

In FIGS. 4 to 8, I illustrate a modified form of track-supported scanner, which represents the presently preferred general form and which incorporates certain further features. Basically, this scanner comprises a base-frame member or chassis 60 which is essentially flat and elongated and is integrally formed with spaced support arms 61-62 configurated to form parts of separate rail clamps, as at 63; the remainder of each clamp is a suitably formed lug member 64 securable by a bolt 65. Rugged clamp action involves both wedged engagement of opposed edges of the rail base 48, and extensive contact of both clamp parts with the underside of the rail base 48.

The complete optical system and preamplifier components are supported on an intermediate frame or cradle structure, extending virtually the full length of the base-frame member 60 and having compliant shock-mounted or floating connection thereto at opposite longitudinal ends. As shown, the intermediate frame comprises laterally spaced elongated beam members 66, rigidly connected by the ties 67-68. Shock-mounted suspension is achieved at each end by plural stiffly compliant loops, suggested at 69 in FIG. 5 but shown in greater detail in the fragmentary view of FIG. 5A; the loops 69 may be spaced turns of a helix of twisted-wire cable, clamped at the top to the tie 67 and at the bottom to a similar tie 70 mounted on the base 60. Such suspension provides good assurance against cradle twisting in the presence of the heavy shock of a passing freight, thus assuring that the viewing axis will not sweep laterally under shock conditions, so that viewing orientation is reliably maintained.

The optical system is preferably horizontally arrayed, between the chassis members 66. It comprises an infrared-transmitting lens 71, as of arsenic-trisulfide glass, contained within a barrel which may be adjustably positioned (for focus) with respect to the heat-sensitive area of the detector cell, schematically indicated at 73. The cell 73 is ruggedly mounted to a preamplifier assembly and housing, schematically indicated at 74. Near the other end of the chassis members 66 a folding mirror 75 is positioned in horizontal alignment with the axis 76 of lens 71, to determine cell response on the upwardly inclined axis 19 previously described.

The scanner is housed within a single cover 77, removably secured to the base 60. The housing 77 is characterized by two projections or humps 78-79, connected by a relatively low-profile section 80, the maximum height being close to the crown of the rail 10, and preferably clearing the same to a small extent C approximating ¼ to ½ inch (see FIG. 6). The housing 77 is preferably an integral rugged metal casing, with sloping end faces inclined at, say, about 45 degrees to help deflect dragging equipment and thus provide a measure of protection for the scanner contents.

In general, the space within the hump 82 accommodates the preamplifier housing 74; the space within the low-profile section 80 accommodates horizontally aligned parts of the optical system and chassis members 66; and the space within the other hump 81 accommodates further scanner parts while also providing the port 83 for viewing on axis 19. For example, a mechanical shutter blade 84 may normally close the port 83; its rotary-solenoid actuator 85 is shown carried by a bracket fixed to an inner wall surface of the hump 81. For actuating the shutter 84, it suffices to say that wheel-operated means such as 12-13 is operative with a suitable storage device to hold shutter 84 in opened position as long as a train is passing the detector location.

In accordance with a feature of the invention, dirt and dust collecting and precipitating means is provided within the scanner housing. In the form shown, such means comprises a honeycomb trap 86, consisting of plural thin-walled elongated tubes 87, permanently secured in closely adjacent parallel relation. In FIG. 7, the trap 86 is seen as a tight cluster of seven such tubes, truncated vertically at the upper end in close clearance with the back of the shutter blade 84, and truncated horizontally at the lower end in clearance relation with the ray bundle serving the horizontally aligned part of the optical system. A bracket 88 welded to the back-side of the trap 86 provides a means of anchorage to the solenoid 85 or its support.

The axis of trap 86 coincides with the viewing axis 19 so that the wall thickness of tubes 86 may have minimum obscuring effect on incoming radiation for detector 73. Also, the longitudinal location of trap 86 should be such that it is essentially offset from the location of mirror 75. This relationship is best understood from FIG. 8 in the context of its operation, serving to keep the optical parts as free as possible from dirt accumulation.

During the passage of trains on rail 10, shutter 84 is continuously open, and there is much turbulence involving swirls of dust-laden air. The space between humps 78–79 serves to break the direct blast of such air through the port 83, but the trap 86 immediately encounters almost all such air as may enter the housing. The walls of tubes 87 provide relatively extensive surface area on which dust may settle, so that very little dust is available outside trap 86 and within the scanner, for accumulation on mirror 75 or lens 71. On rainy days, the substantial moisture on the swirling air precipitates as droplets on the walls of tubes 87, falling from each tube at alignments 89, 89', 89'', determined by each tube's lowermost edge. Since these alignments are offset from the mirror 75, the dirt-laden drippings fall free to a trough 90 in the base 60, for gravity discharge at a strainer and drain 91. In this manner, the trap 86 collects dust and dirt on dry days, and becomes self-cleaning on rainy days. In practice, the lens 71 and mirror 75 are formed to be relatively free of dirt even on the infrequent occasions of regular monthly inspection and check-out of the scanner.

Alternatively, the trap 86 may be dipped in motor oil, forming an extensive tacky-surface area for dust collection. This has been found so effective as to obviate the need for cleaning optical parts more often than three or four times per year. The trap itself is cleaned by merely dipping in solvent such as gasoline, prior to recoating with clean motor oil.

As a further feature of the scanner housing of FIG. 4, the adjacent facing walls 92–93 of the humps 78–79 are convex and generally vertical and arcuate; this shaping is found to provide maximum self-cleaning action in the viewing region between humps 78–79, i.e., the danger of leaf or snow accumulation in this region is quickly minimized in the presence of a moving train. Also, the upper surface of the low-profile section 80 is characterized by oppositely sloping roof-like flats 94–95, inclined down and away from an elongated central ridge 96; electrical heater elements (as at 97) bonded to the undersides of flats 94–95 may be operated under snow or icing conditions, to assure against obstructing accumulation between trains, it being understood that the melt runs freely out of any possible view-obstructing position. It will be understood that further heater elements may be provided elsewhere on the inner surfaces of the scanner-housing walls to prevent snow or ice accumulation, as for example at 98–99 beneath the upper walls of humps 78–79. Thus equipped, the scanner of FIG. 4 has operated trouble-free in spite of severe winter conditions.

By having the surfaces 92–93 concave, and the flats 94–95 sloping away from the ridge 96, it will be seen that the central vertical plane between the surfaces 92–93 forms the throat of an aerodynamic shape in the nature of a venturi section. The technical explanation has not yet been ascertained but it is certain that in the presence of air turbulence occasioned by passing trains, the region in the vicinity of the shutter and its opening 83 remains remarkably free of dirt accumulation. This may be due to the reduced-section "venturi" effect, producing greatest air velocity through the throat section, and therefore least pressure at the opening 83.

With the surface 92 arcuate, the shutter blade 84 is preferably also arcuate and mounted for lateral displacement about the axis of the arcuate surface; the heavy dashed line connecting actuator 85 to shutter 84 will be understood to schematically indicate such mounting of the shutter 84. This assures that the dust trap 86 may extend as close as possible to the opening 84, particularly when the vertical truncation of the ends of tubes 87 is similarly arcuate.

FIGS. 9 to 13 illustrate in greater detail the presently preferred embodiment, which generally incorporates features discussed in connection with FIGS. 4 to 8. For example, the same track-mounting means 61–62, base frame 60 and single housing cover 77 will be recognized in FIG. 9. Also, an intermediate frame or cradle structure, for the bolometer-preamplifier unit 74 and optical elements 71–75, extends virtually the full length of the base-frame member 60, between end shock-mounting connections 69.

The cradle structure utilizes the bolometer-preamplifier housing 74 as the right-hand end, with transversely spaced lugs 110 as the means of connection to the load-plate 111 of the compliance 69. The remainder of the cradle comprises spaced elongated arms 112–113 integrally joined by a yoke 114 which is suitably inclined to additionally provide the bed against which mirror 75 is set, by side clamps as at 115. Each of the arms 112–113 is suitably flanged at 116, for bolted connection to housing 74, to provide an integrated cradle and detector system. The leftward-projecting ends of arms 112–113 are secured to the load plate 111' of the left-end compliance 69 in the manner described at plate 111.

Ordinarily, the described compliances 69 are perfectly adequate for the shock-mounting and alignment retention of the cradled scanner elements. However, there are occasional severe or extreme shocks, as from a heavily loaded wheel with a localized flat, or as from a dragging element which might strike housing 77 at high speed. For such occasions, the cradle suspension includes snubbers to limit complaint displacements of the cradle and to dampen the tendency of their occurrence; these snubbers provide reaction against plural primary orthogonally related components of cradle displacement. In general, these snubber or damping devices are identified as like structures 117 contained within the coils of each of the compliances 69, and spaced pairs of snubber brackets 118–119 along the length of arms 112–113.

Each snubber structure 117 is of the character shown in detail in FIG. 10. It comprises an upper element or subassembly 120 vertically reciprocably interlaced with a lower element or subassembly 121. The lower element 121 is rigid and may be integrally formed as a single elongated part. It comprises spaced elongated feet or base flanges 122–122', with like upstanding elongated prismatic pedestals 123–123' joined by a relatively thin elongated upstanding wall or central bridge 124; bolt means 69' secures feet 122–122' to the lower load plate of the compliance 69, and to the base plate 60. The upper element 120 has a rigid channeled base or frame 125, with spaced side walls 126–126' which straddle the upstanding rigid parts 123–124–123' of the lower element 121; bolt means 124' (FIG. 9) secures channel 125 to the underside of the load plate 111 (111') of the compliance 69, and to the respective ends of the cradled structure (112–113, 110). Bonded to the inner surfaces of channel 125 is a grouping of two pairs of snubber blocks 127–127' and 128–128' which coact with the upstanding parts of element 121 under extreme shock conditions. These blocks may be of relatively stiff rubber or rubber-like material, such as neoprene, with a durometer hardness in the order of 40–45; they are not normally in contact with the lower unit 121, being in close clearance with parts 123–124–123'. The transversely spaced blocks 127–127' are carried by the bottom of channel 125 in vertical overstanding alignment with the top surfaces of pedestals 123–123', the normal small vertical clearance therebetween being suggested at 129 (FIG. 9); the lower-edge contour of side walls 126–126' may slope downwardly, from each channel end, to the deep central region of support for blocks 128–128'. The block pair 128–128' which straddles the bridge 124 is carried by opposed channel side walls 126–126', in similar clearance relation, suggested at 130, to provide assurance against excessive longitudinal displacement; further similar clearances, not identified by number, will be understood to apply between end faces of blocks 128–128' and the adjacent ends of pedestals 123–123' at their regions of overlap, to provide assurance against excessive lateral displacement. The cumulative longitudinal and lateral displacements which are thereby afforded (i.e., short of snubber contact, and upon take-up of the indicated clearance) may be in the order of 1/16 inch; the vertical clearance 129 may be of the same size.

In FIG. 11, each of the snubber assemblies 118 is seen to comprise a bracket with an upstanding arm 131 formed with a horizontal base 132 bolted to the base plate 60, between cradle arms 112–113. The bracket further includes an upper lug or finger 133 overstanding the upper edge of the adjacent cradle arm. Resilient snubber blocks 134–135, of the nature described for blocks 127–128, are respectively bonded to arm 131 and lug 133 and are also positioned in close clearance (e.g., 1/16 inch) relation with adjacent cradle-arm surfaces. The snubber means 119 will be understood to be similar to that of FIG. 11, except for omission of the top lug and block 133–135, and to provide lateral snubbing action with the inner side faces of arms 112–113, after displacement through an initial lateral clearance. The lateral-clearnce provision at means 117–118–119 is preferably the same at all four of the longitudinal regions involved, thereby minimizing any tendency of transiently shocked lateral warping of the cradle frame.

FIG. 9 also shows important details of the mechanical shutter 84, which will be recalled as an arcuate blade, normally closing the viewing opening 83, in absence of a passing train. Blade 84 is seen in FIGS. 9 and 12 to be carried at one end of an overhanging arm 137, suspended on a vertical pivot axis from a bearing assembly 138 carried by the top wall 78; shading for plastic in the bushing elements of bearing 138 will be understood to suggest use of self-lubricating low-friction bearing material such as one of the varieties utilizing the desirable properties of Teflon, in fiber or other form. Shutter arm 137 is shown to include a counterweight portion 139; and an annular seal 140 to the hub 141 of arm 137 protects upper bearing elements against dust. The lower rim projection of hub 141 is vertically slotted to receive the drive pin 142 of shutter-actuating mechanism.

The shutter-actuating mechanism is not shown in detail, but it includes an intermediate chassis 143 which carries a rotary solenoid 144 and output-drive connections (suggested at 144'–144") to the upstanding shaft 145 which includes pin 142. Chassis 143 is carried by housing 77, being suspended by plural spaced shock mounts 146–147 from suitable lugs 148–149 formed in the casting of the housing 77. A detachable electrical-connector fitting 150 also includes a part carried by chassis 143.

It will be appreciated that shutter longevity and operation reliability are enhanced by the described separate mounting of the shutter arm 137 on the one hand, and of the actuator chassis 143 on the other hand. Universal action characterizes the axially movable keyed drive connection of shaft 145 to hub 141, and this may be enhanced by universal-joint connection to shaft 145 (suggested at 151). The lowest drive element 144' is seen to vertically clear the detector-chassis members 112–113, and the top snubbers 135 at 118 assure no interference with shutter action, under the most severe jouncing of members 112–113.

As a further feature, the shutter 84 incorporates a self-calibrating device to provide an automatic check of detector operation, every time the shutter operates. If desired, such checking may also be done on command, as by maintenance personnel, utilizing circuitry not shown herein. In the form shown, a small heater element 155 is carried at one lateral side of the blade 84, normally out of alignment with the ray bundle of detector-response axis 19. Heater 155 is bonded to an insulating mounting base or strip 156, which is secured by means 157 to the edge of blade 84. Flexible supply leads to the heater 155 are contained in suitable cabling 158, clamped at 159 to arm 137 and served by connector means 150. FIG. 12 illustrates that in the actuated movement of shutter 84 from its normally closed position (solid outlines) to its open position (phantom outlines 137'–84'), heater 155 transiently crosses the detector-viewing axis 19, to a position 155' out of viewing alignment and on the opposite lateral side of axis 19'.

In connection with FIGS. 4 to 8, it has been explained that shutter actuation is based on wheel-operation, as at 12–13, in conjunction with a storage circuit; this is also true for FIGS. 9 to 13, as will be explained in connection with the block diagram of FIG. 12A. There, a single block is shown for the wheel-operated signal generator which includes flip-flop 34, for the normal gate (31) operation associated with journal-bearing observation, the gated signals being shown fed to recorder means 26. Actuation of the shutter solenoid 144 involves a relay 152, which remains picked-up or energized as long as a storage circuit 153, with time constant in the order of 5 seconds, provides a sufficient output voltage; storage circuit 153 is shown connected for response to the output of wheel-operated means 12–13–34. Now, in order that the detected calibrating signal (scanned as the shutter heater 155 passes through the detector-response alignment) may be gated to the recorder 26, I show a further connection 154 for operating the gate 31; connection 154 may include a timer, set for an ample interval (e.g., 200 milliseconds) to assure full motion of the shutter, from open to closed, or from closed to open, positions. Timer 154 may be connected for response to both pick-up and drop-out of relay 152, in which case two calibrating signals will be generated for each train passage. Alternatively, if desired, only one calibrating signal may be generated, at the beginning or at the end of train passage, depending on whether timer 154 is connected to respond to pick-up or drop-out of relay 153, as the case may be.

It has been explained that heater 155 is insulated from blade 84, thus assuring that blade 84 is free to assume an ambient reference consistent with the normal desired detector-referencing function of the shutter blade, as more fully set forth in Pat. No. 2,880,309. This means that heater 155 has only a transient effect on the detector, on opening and on closing the shutter, i.e., at the beginning and at the end of the chart record for any particular train.

The nominal heating capacity of heater 155 will be better appreciated from a more complete review of preferred heating conditions within housing 77. The heaters 97–99 will be recalled as providing a de-icing or ice-retarding function; they also serve to maintain a uniform operating temperature within the housing 77, under control of thermostat means 164, normally set to 100° F. The power dissipation at heaters 97–99, for this purpose, is in the order of 200 watts. By contrast, the calibration heater 155 may be of very substantially less, even minimal, capacity; my satisfactory experience has involved use of a standard, commercially available, purchased part for heater 155, being a 6-watt element, 1.5-inches long, 0.25-inch wide, and 0.075-inch thick.

FIG. 13 illustrates a chart record for the detectors on or alongside the respective rails of the track, at a given hotbox-detector installation. On the $a$-side installation, a first pip 160 reflects scan of the shutter-borne heater 155 upon shutter-opening. The ensuing pips 161 ... 162 reflect normal hotbox-detector scanning of the train, and the final pip 163 reflects a second scan of the heater 155, upon closure after the usual five-second delay following the last axle scan on the train. On the $b$-side of the train, similar shutter pips 160'–163' appear, to show the fidelity with which optical and electrical parts of the detector system are operating. It will, of course, be understood that the "calibrating" pips 160–163 (160'–163') provide important criteria applicable to the more intelligent interpretation of the hotbox-detector chart recording for the particular side of any given train, so that unnecessary and costly train stopping is substantially reduced.

While the features and advantages of the described detector construction are, of course, applicable to the preferred rail-mounted embodiment, it will be appreciated that many of these features and advantages apply to more conventional hotbox detectors, such as those which may be mounted on concrete foundations, on pedestals, or on the cross-ties of the track. Also, modifications from the described arrangements may be made without departing from the scope of the invention, as defined in the claims which follow.

What is claimed is:

1. In combination, a length of railroad track; a car on said track and having a truck with a side frame carrying a bearing at one end, a wheel riding said track, and an axle supported in said bearing, said bearing including externally exposed portions projecting inwardly and outwardly of said truck side frame; and a hotbox detector including a housing fixedly mounted alongside said track and beneath the path of movement of said bearing, said hotbox detector comprising a cell element having a sensitive portion responsive to incident infrared radiation to produce an electrical response, optical means imaging said sensitive portion externally of said housing and along an axis that is substantially in a vertical plane parallel to said track, said axis extending both in the general longitudinal direction of the track and upwardly at an acute angle to the horizontal, said housing having an opening for optical viewing on said axis and including a dust trap intermediate said opening and said optical means, said trap comprising a honeycomb structure having elongated walled openings in the alignment of said axis and thus presenting minimum obstruction to viewing on said axis, said trap being effectively offset from vertical overlap with any optical element, whereby drippings from said trap in rainy weather may fall free of contact with any optical element wherein said optical means comprises a focusing element on a horizontal alignment and a folding mirror longitudinally spaced therefrom and folding the horizontal alignment to the said upwardly inclined viewing axis, said trap being above and effectively longitudinally intermediate said focusing element and said mirror.

2. The combination of claim 1, in which said trap comprises a cluster of parallel thin-walled tubes extending on the upward inclination of the viewing axis.

3. The combination of claim 2, in which said tubes are truncated in essentially a common vertical surface close to the opening in said housing.

4. The combination of claim 1, in which a shutter blade is positioned adjacent the inside of the opening during intervals between passing trains and is laterally moved out of the closed position during train passage, said trap being truncated in close clearance relation with the back side of said shutter blade.

5. In combination, a length of railroad track; a car on said track and having a truck with a side frame carrying a bearing at one end, a wheel riding said track, and an axle supported in said bearing, said bearing including externally exposed portions projecting inwardly and outwardly of said truck frame; and a hotbox detector including a housing fixedly mounted alongside said track and beneath the path of movement of said bearing, said hotbox detector including an optical system and cell and preamplifier and unitary elongated supported means therefor, said cell having a sensitive portion responsive to incident infrared radiation to produce an electrical response, optical system imaging said sensitive portion externally of said housing and along an axis that is substantially a vertical plane parallel to said track, said axis extending both in the general longitudinal direction of the track and upwardly at an acute angle to the horizontal, spaced compliant shock mounts isolating the longitudinal ends of said supporting means from said housing, said optical system including a focusing element on a horizontal alignment and a folding mirror longitudinally spaced therefrom and folding the horizontal alignment to said upwardly inclined viewing axis.

6. The combination of claim 5, in which said detector housing comprises two longitudinally spaced upwardly projecting humps with a low-profile connection therebetween, one of said humps having a viewing opening on said viewing axis in the side adjacent the other hump.

7. The combination of claim 6, in which the adjacent sides of said humps are generally vertical and convex.

8. The combination of claim 6, in which the longitudinal remote sides of said humps are downwardly sloping to provide deflectors for dragging equipment.

9. The combination of claim 6, in which the said low-profile connection is characterized by a central upper elongated ridge between said humps, with upwardly facing side surfaces sloping down and away from said ridge.

10. The combination of claim 9, in which electrical heating means is provided at the inner surfaces of side surfaces.

11. In combination, a length of railroad track; a car on said track and having a truck with a side frame carrying a bearing at one end, a wheel riding said track, and an axle supported in said bearing, said bearing including externally exposed portions projecting inwardly and outwardly of said truck frame; and a hotbox detector including mounting means fixed alongside said track and beneath the path of movement of said bearing, said hotbox detector including an optical system and cell and preamplifier and unitary elongated supporting means therefor, said cell having a sensitive portion responsive to incident infrared radiation to produce an electrical response, said optical system imaging said sensitive portion externally of said housing and along an axis that is substantially in a vertical plane parallel to said track, said axis extending both in the general longitudinal direction of the track and upwardly at an acute angle to the horizontal, and a cradled suspension for said supporting means between longitudinally spaced portions of said mounting means.

12. The combination of claim 11, in which said cradled suspension includes like shock-mount connections at said longitudinally spaced portions of said mounting means.

13. The combination of claim 12, in which said shock-mount connections comprise, at each longitudinal location thereof, like arrays of stiffly compliant loops, said arrays being oriented substantially horizontally and normal to the axis of rail elongation and straddling the vertical plane which includes the optical system and cell, whereby assurance is had against cradle twisting and attendant lateral sweep of the viewing axis during train passage.

14. In combination, a length of railroad track; a car on said track and having a truck with a side frame carrying a bearing at one end, a wheel riding said track, and an axle supported in said bearing, said bearing including externally exposed portions projecting inwardly and outwardly of said truck frame; a hotbox detector including mounting means fixed alongside said track and beneath the path of movement of said bearing, said hotbox detector including an optical system and cell and preamplifier and unitary elongated supporting means therefor, said cell having a sensitive portion responsive to incident infrared radiation to produce an electrical response, said optical system imaging said sensitive portion externally to said housing and along an axis that is substantially in a vertical plane parallel to said track, said axis extending both in the general longitudinal direction of the track and upwardly at an acute angle to the horizontal, and a cradled suspension for said supporting means between longitudinally spaced portions of said mounting means; and a mechanical shutter pivotally mounted to said mounting means on a vertical driven axis and movable between a closed position aligned with the detector-response axis and an open position out of such alignment, actuator means for said shutter including a shock-mounted suspension from said mounting means, said last-mentioned suspension being independent of the pivotal mounting of said shutter to said mounting means, and an axially-movable keyed universal-action actuating connection from said actuating means to said shutter, whereby minimal inertia characterizes the shutter mounting per se, and further whereby actuator vibration is substantially independent of said shutter.

15. The combination of claim 14, in which said suspension includes motion-limiting snubber means coacting between said mounting means and said cradled suspension only for relative displacements thereof beyond a predetermined clearance relation.

16. The combination of claim 15, in which said snubber means is positioned for reaction against primarily longitudinal relative displacements of said mounting means and of said suspension.

17. The combination of claim 15, in which said snubber means is positioned for reaction against primarily vertical relative displacements of said mounting means and of said suspension.

18. The combination of claim 15, in which said snubber means is positioned for reaction against primarily lateral relative displacements of said mounting means and of said suspension.

19. The combination of claim 15, in which said snubber means includes, in the vicinity of each of the longitudinally spaced mounting connections of said suspension, like means reacting against plural primary orthogonally related components of relative displacements of said mounting means and of said suspension.

20. In combination, a length of railroad track; a car on said track and having a truck with a side frame carrying a bearing at one end, a wheel riding said track, and an axle supported in said bearing, said bearing including externally exposed portions projecting inwardly and outwardly of said truck side frame; and a hotbox detector including housing means mounted alongside a rail of said track beneath the path of movement of said bearing, said housing means having a viewing opening and containing an optical system and cell with an infrared-sensitive area aligned for response to infrared radiation incident on an upwardly inclined axis through the opening, said cell producing an electrical response to incident infrared radiation, and a mechanical shutter movably carried by said housing means at the viewing opening, said shutter having a closed position wherein said cell is exposed to said shutter and having an open position wherein said cell is externally exposed through the opening, a local heat source carried by said shutter out of cell-response alignment when in open position and when in closed position and passing through such alignment in the course of shutter movement, and means including a wheel-operated trip for actuating said shutter, whereby a calibrating heat signal is generated by said hotbox detector by scan of said heat source upon shutter displacement.

21. The combination of claim 20, in which said housing means includes further heating means and thermostat means for maintaining substantially a preset ambient heat environment within said housing means, the power-dissipating capacity of said shutter-mounted heat source being substantially less than that of said further heating means.

22. The combination of claim 21, in which the dissipating capacity of said shutter-mounted heat source is in the order of less than five percent of that of said further heating means.

23. The combination of claim 20, including wheel-operated gating means for the output of said cell, said shutter-actuating means including a storage circuit having a time constant adequate to hold the shutter-open position as long as wheel operation is at a recurrence frequency reflecting at least a predetermined minimum speed of a passing train, and means responsive to shutter actuation for actuating said gating means, whereby a gated calibrating output of said cell is developed upon shutter actuation.

24. The combination according to claim 23, in which said last-defined means includes timing means preset for the anticipated time for actuated displacement of said shutter.

25. The combination of claim 23, in which said shutter-actuating means includes relay means responsive to the output of said storage circuit for determining shutter operation, said gating means including a control connection to said relay means.

References Cited

UNITED STATES PATENTS

| 2,680,585 | 6/1954 | Crede | 248—21 |
|---|---|---|---|
| 3,065,347 | 11/1962 | Bossart | 246—169X |
| 3,108,773 | 10/1963 | Pelino | 246—169 |
| 3,454,758 | 7/1969 | Gallagher | 246—169 |

ARTHUR L. LA POINT, Primary Examiner

G. H. LIBMAN, Assistant Examiner

U.S. Cl. X.R.

248—358